United States Patent [19]

Sommerfeldt et al.

[11] Patent Number: 5,094,346
[45] Date of Patent: Mar. 10, 1992

[54] REUSABLE CONTAINER FOR TAPE PANCAKES

[75] Inventors: Frank A. Sommerfeldt, New Richmond; Carl D. Jacobsen, Hudson, both of Wis.; Michael R. Harms, Rochester, Minn.

[73] Assignee: Minnesota Mining and Manufacturing Company, St. Paul, Minn.

[21] Appl. No.: 696,520

[22] Filed: May 7, 1991

[51] Int. Cl.⁵ .................................... B65D 85/67
[52] U.S. Cl. ................................ 206/394; 206/386; 206/598; 206/600; 206/444; 242/72 R
[58] Field of Search ............ 242/72 R; 206/391, 394, 206/444, 403, 407, 408, 598, 600, 303, 386

[56] References Cited

U.S. PATENT DOCUMENTS

| | | | |
|---|---|---|---|
| 4,069,914 | 1/1978 | Damsky | 206/303 |
| 4,124,173 | 11/1978 | Damour | 242/72 B |
| 4,491,222 | 1/1985 | Gacetta et al. | 206/394 |
| 4,516,786 | 5/1985 | Lund | 279/2 R |
| 4,708,246 | 11/1987 | Minion | 206/394 |
| 4,730,779 | 3/1988 | Thievessen | 242/72 R |
| 4,792,044 | 12/1988 | Nishizawa et al. | 206/394 |
| 4,883,178 | 11/1989 | Thiele et al. | 206/391 |
| 4,893,765 | 1/1990 | Randolph | 242/72 R |
| 4,955,471 | 9/1990 | Hirose et al. | 206/303 |

*Primary Examiner*—William I. Price
*Attorney, Agent, or Firm*—Gary L. Griswold; Walter N. Kirn; Charles D. Levine

[57] ABSTRACT

A container for pancakes of recording tape has an L-shaped base, mandrels extending horizontally from the base on which pancakes are placed, and a cover which encloses the pancakes. The circumference of each mandrel is expandable to secure the pancakes in position. Each mandrel includes a frame having a longitudinal slot, an expander cam disposed for rotation in the slot, a flexible cover, and an end cap. The cover includes recesses for receiving and supporting the free ends of the mandrels.

19 Claims, 5 Drawing Sheets

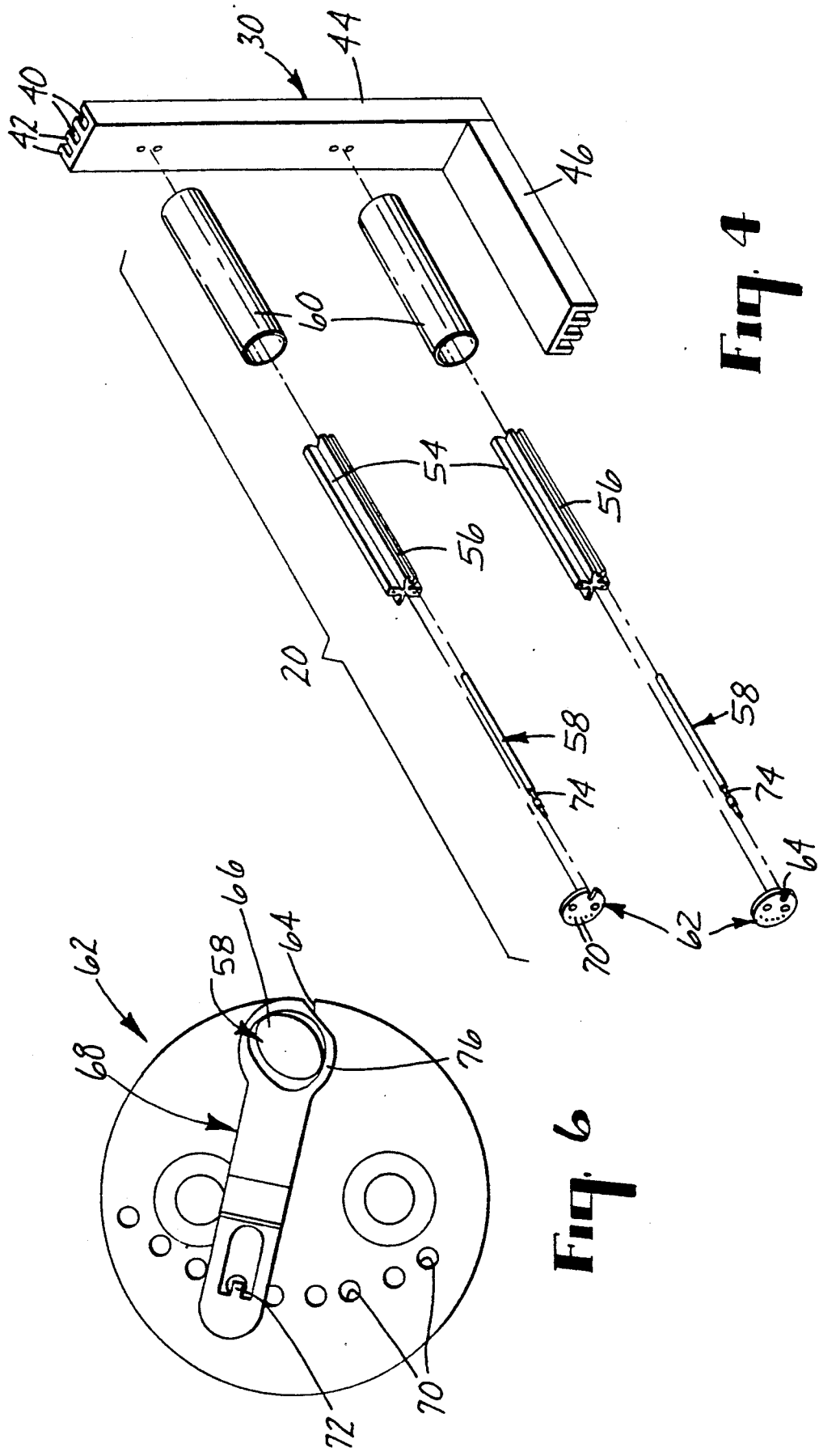

REUSABLE CONTAINER FOR TAPE PANCAKES

TECHNICAL FIELD

The present invention relates to shipping containers for tape pancakes. More particularly, the present invention relates to reusable, ergonomic shipping containers for magnetic tape pancakes.

BACKGROUND OF THE INVENTION

In producing magnetic recording media, there is a recurring need to transport large quantities of recording tape from the point of tape manufacture to other locations for final loading into cassettes, cartridges, or other carriers. It is common to transport the tape in the form of relatively large rolls, called "pancakes." A pancake of 1.27 cm (0.5 in) wide tape is typically wound on a hollow annular core having an outer diameter of 11.4 cm (4.5 in), and a width of 1.8 cm (0.7 in), slightly larger than the width of the tape. The outer diameter of the pancakes is typically about 35.6–40.7 cm (14–16 in). Shipping these tape pancakes over long distances under conditions of mechanical shock and vibration requires that they be well supported.

One primary form of damage to pancakes is axial shifting of the layers of tape relative to the pancake such that the pancake is no longer flat. This shifting, called "core drop," is measured by laying the pancake on a flat surface and measuring the height of the tape portion of the pancake at the inner and outer radii. Measurements are made both before and after subjecting the pancake to shock or vibration. Core drop during shipping is typically caused by a stack of pancakes being dropped on a hard floor or being transported over rough or bumpy surfaces. Other problems and damage caused with known pancake containers include the offsetting of a portion of the pancake, called "upset," rotation of the core relative to the pancake, and transfer of cushion adhesive to the tape.

While effective protection of the tape in the pancake stacks is essential, the magnetic tape market is very price-competitive. Therefore, protective packaging must be low cost, both in the packaging material itself, and in the labor required to apply and remove the packaging. It is also desirable to minimize the amount of packaging waste material which must be discarded.

Known methods of protecting pancakes during shipping generally involve sliding several pancakes over a shaft or hollow tube, placing resilient spacers between each pancake, and disposing a solid end plate on the top and bottom of the stack. The stack can be held together by shrink wrap film, as disclosed in U.S. Pat. No. 4,955,471. However, the application and removal of shrink wrap film is very labor-intensive. Removal can involve cutting or other operations which can damage the pancake and generate waste which can contaminate the tape. Also, shrink wrap is not reusable, thereby increasing costs.

The shrink wrap removal problem is addressed in U.S. Pat. No. 4,708,246, assigned to Minnesota Mining and Manufacturing Company. This patent discloses providing grooves in the outer surface of the package to allow a knife to cut the shrink wrap without contacting the inner packaging material. This is accomplished by running the knife along the groove, without penetrating beyond the depth of the groove as the shrink wrap is cut.

U.S. Pat. No. 4,883,178 eliminates shrink wrap. This patent discloses holding the stack together with a threaded member running coaxially along the center of the stack, and a nut which tightens on an endplate. This method is less labor intensive than shrink wrap, but it does not enclose the stack, so that additional wrapping may still be required.

Whenever axial compression is used to hold the pancakes together, the compression itself may damage the pancakes. U.S. Pat. No. 4,708,246 discloses spacers and other packaging features which improve compression control. It is desirable, however, to secure pancakes during shipping without relying primarily on stack compression.

Radially expanding mandrels are also known. U.S. Pat. No. 4,124,173 discloses an inflatable tube inside of an expandable mandrel. Cam mechanisms which press cylinder segments outwardly when a central shaft rotates relative to the outer segments are also known. U.S. Pat. No. 4,516,786 discloses a rotatable core chuck and U.S. Pat. No. 4,730,779 discloses an expanding assembly for a web-coiling core. These cores are used in rotating apparatus and must be heavy and complex to accommodate the dynamics of rotating environments.

In the majority of cases, the pancake is placed on an unwind apparatus to feed the tape into a cassette or cartridge loading machine. The pancake is loaded onto the machine with the core axis horizontal. Since a typical pancake can weigh over 7.8N (4 lb), the effort required to remove the pancake from its package and place it on the unwind apparatus is significant. Additionally, most known pancake packaging stacks the pancakes vertically. This requires the extra step of either tipping the entire stack or individual pancakes to a position with a horizontal axis before loading the pancakes onto the loading machine. Due to the weight of the pancakes and the repetitive nature of this task in production, worker fatigue and injury can be significant problems. It is desirable that the packaging be ergonomically designed to reduce the effort required to load the pancakes onto the loading machine without risking tape damage, or injury to the workers.

SUMMARY OF THE INVENTION

The ergonomic and reusable container for pancakes of the present invention overcomes the disadvantages of the known containers and shipping devices. The pancakes are stacked horizontally to eliminate the need to rotate the pancakes before use. The container eliminates use of shrink wrap and other non-reusable wrapping materials. Additionally, the container is simple and lightweight. The container includes a base, at least one mandrel extending from the base on which pancakes can be placed, a cover which encloses the pancakes, and a spacer disposed between adjacent pancakes on each mandrel.

The circumference of each mandrel is expandable to provide a radial load on the pancakes to secure the pancakes in position. Each mandrel includes a mandrel frame having a longitudinal slot, an elongate expander cam which can rotate in the longitudinal slot, a flexible mandrel cover, and an end cap disposed on the free end of the mandrel which receives the expander cam. A wrench rotates the expander cam to expand or contract the circumference of the mandrel and also serves to lock the expander cam in position in combination with locking holes in the end cap. The wrench includes a locking tang which is receivable in one of the locking holes while the cam-engaging portion of the wrench remains on the expander cam to lock the cam. A snap ring prevents the wrench from being removed inadvertently from the cam.

Additionally, a compression plate can be placed on the end cap to compress the pancakes on the mandrel and provide an axial compression load in addition to the radial load. A cylindrical compression ring is placed on the end cap over the compression plate. The outer edge of the end cap has a thread which receives the compression ring which presses the compression plate against the pancakes as the compression ring is screwed onto the end cap.

Preferably, the base is L-shaped and the mandrels extend from the vertical portion of the L. The base includes an L-shaped frame and an L-shaped enclosure which receives the L-shaped frame in a cavity. The cover includes recesses for receiving and supporting the free ends of the mandrels and has an internal space shaped to approximate the shape and size of a plurality of pancakes.

BRIEF DESCRIPTION OF THE DRAWINGS

FIG. 4 is an exploded perspective view of the frame and mandrels of the base of FIG. 2.

FIG. 6 is an end view of the mandrel of FIG. 4 with the wrench locked in position.

DETAILED DESCRIPTION OF PREFERRED EMBODIMENTS

Figure 1:
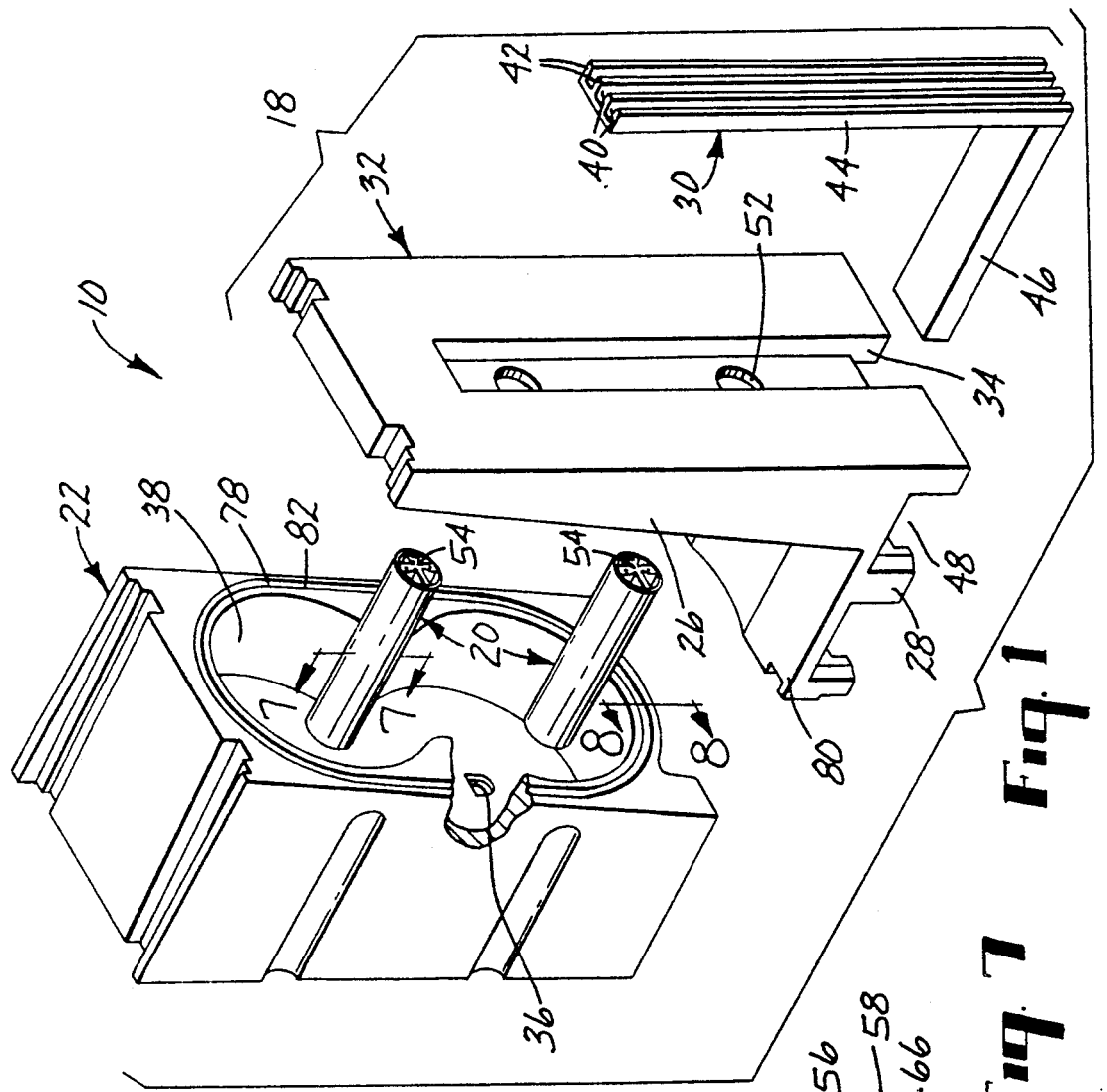
FIG. 1 is an exploded view of a container according to the present invention.

FIG. 1 illustrates the container 10 of the present invention. The container 10 is used for pancakes 12 of recording tape, each of which includes a quantity of tape 14 wound around a flangeless core 16 which extends approximately 0.25 cm (0.1 in) on each side of the tape 14. The container 10 includes a base 18, at least one mandrel 20 extending from the base 18 on which a plurality of pancakes 12 can be placed, and a cover 22 which combines with the base 18 to completely enclose the pancakes 12. A spacer 24, shown in FIG. 2 with an adjacent pancake 12 removed, can be disposed between adjacent pancakes 12 on each mandrel 20 to provide clearance between adjacent pancakes 12. Preferably, the spacers 24 are made of soft foam or elastomeric material. Deformable end pads (not shown) can be placed on the walls of the base 18 and the cover 22 to further protect the pancakes 12. The peripheral edges of the pancakes 12 are completely exposed to allow them to be grasped symmetrically to reduce the effort needed to remove the pancakes 12 from the mandrel 20. This reduces the risk of damage to the pancakes 12 and injury to workers.

Figure 2:
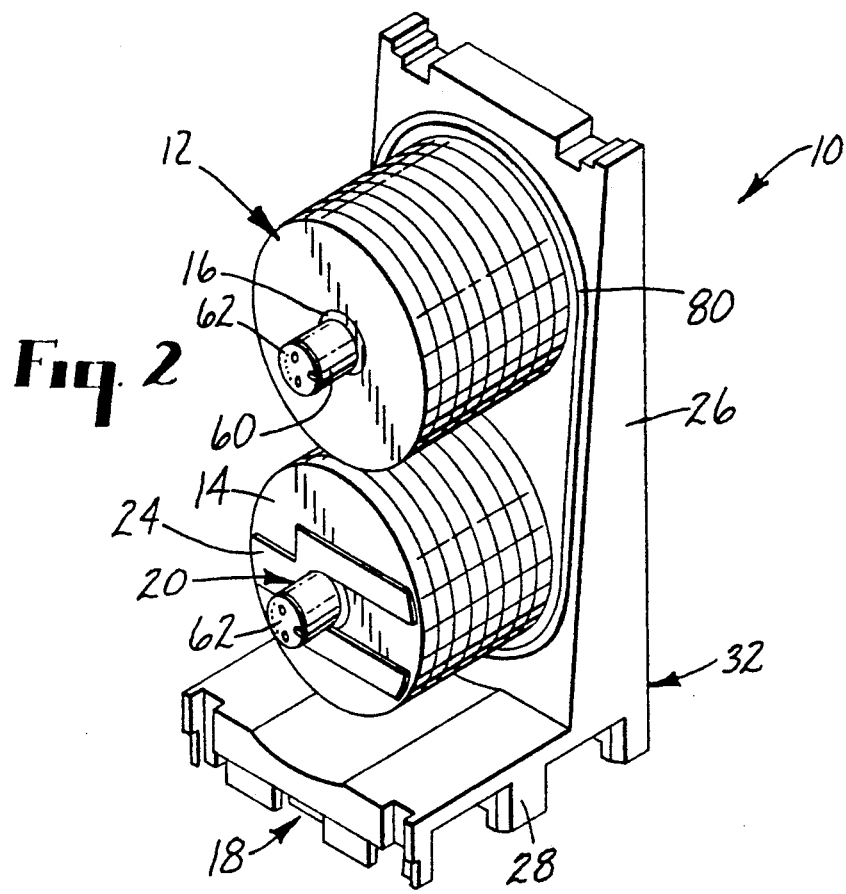
FIG. 2 is a perspective view of the base of the container of FIG. 1.

Preferably, the mandrels 20 are positioned horizontally and slightly upwardly, as shown in FIGS. 1 and 2. This stacks the pancakes 12 horizontally. Since cassette loading machines, which uses magnetic tape in pancake form, require the pancakes 12 to be oriented with a horizontal axis, the horizontal mandrels 20 eliminate the need to rotate the pancakes 12.

In the preferred embodiment, the base 18 is L-shaped having a vertical portion 26 and a horizontal portion 28. The mandrels 20 extend from the vertical portion 26 of the L. The base 18 includes an L-shaped frame 30 and an L-shaped enclosure 32. The enclosure 32 has a cavity 34 which receives the frame 30. The frame 30 is secured to the enclosure 32 in the cavity 34 by bolts or other fastening devices. The cover 22 optionally includes recesses 36 for receiving and supporting the free ends of the mandrels 20. The cover 22 has an internal space 38 shaped to approximate the shape and size of a plurality of pancakes 12. This minimizes the volume of space around the pancakes 12 and increases the rigidity of the cover 22.

Figure 3:
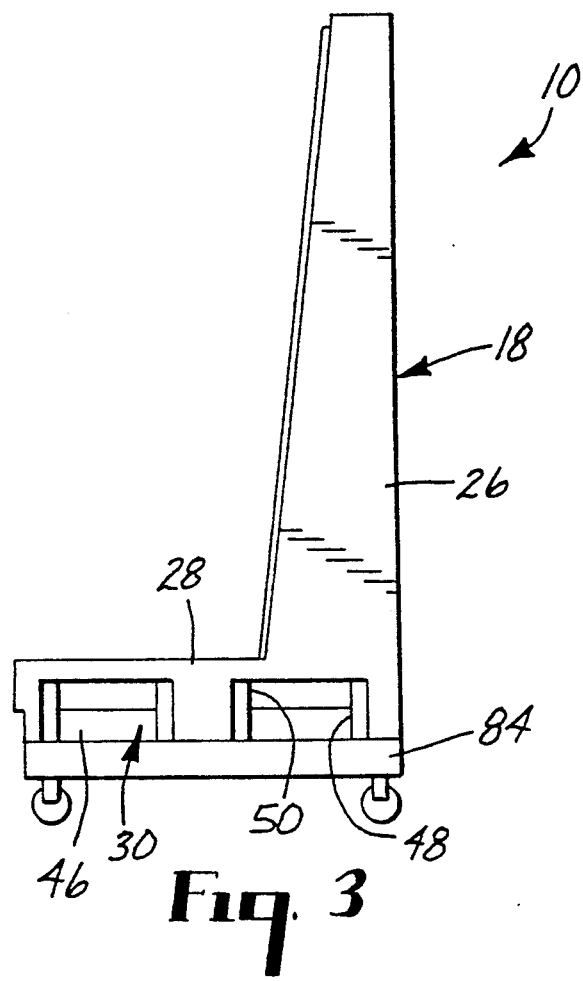
FIG. 3 is a side view of the base of FIG. 2.

The L-shaped frame 30 is formed of multiple channels 40, formed of straight sections 42 as shown in FIG. 1, which support the weight of the mandrels 20 and the pancakes 12. The frame 30 can be formed by extruding vertical portion 44 and horizontal portion 46 and welding them together at substantially right angles. The frame 30 is made of metal having a high strength-to-weight ratio, such as aluminum, and is designed to flex. To accommodate flexing, the angle between the vertical and horizontal portions 44, 46 of the frame 30, and between the vertical and horizontal portions 26, 28 of the base 18, can be obtuse. An obtuse angle, as best shown in FIG. 3, also improves the strength-to-weight ratio of the enclosure 32 and the cover 22, which can be made from high density polyethylene by rotational molding to create strong, lightweight, hollow shells. Additionally, the enclosure 32 and cover 22 can be filled with an insulating foam such as urethane to maintain a constant temperature within the container 10 and prevent core drop which can result from temperature changes.

Notches 48 are formed in the bottom of the enclosure 32 perpendicular to the horizontal portion 46 of the L-shaped frame 30. The notches 48 have a height greater than that of the horizontal portion 46 of the frame 30 to form channels 50 defined at the top by the top of the notch 48 and at the bottom, at least in part, by the top of the horizontal portion 46 of the frame 30, as shown in FIG. 3. The channels 50 extend across the horizontal portion 46 of the frame 30 and can receive the tines of fork lifts and similar devices. The containers 10 will not tip when lifted because the tines are located above the horizontal portion 46 of the frame 30.

The mandrels 20 pass through holes 52 in the enclosure 32 and into the L-shaped frame 30 of the base 18. The mandrels 20 can be attached to the vertical portion 44 of the frame 30 by bolts or other fastening devices.

Figures 5, 7:
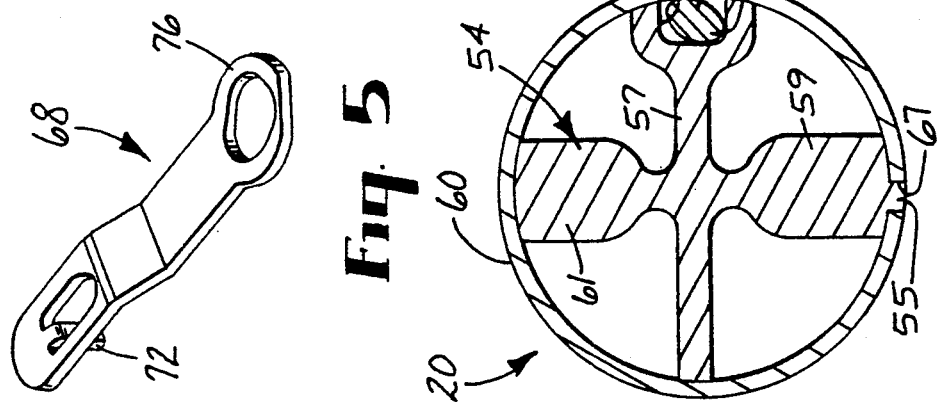
FIG. 5 is a perspective view of the wrench of the container of FIG. 1.
FIG. 7 is a cross-sectional view of the mandrel taken along line 7—7 of FIG. 1.

The circumference of each mandrel 20 expands to tighten against the inside of the cores 16 to secure the pancakes 12 in position. As shown in FIGS. 4-7, each mandrel 20 includes a cross-shaped mandrel frame 54 secured to the vertical portion 44 of the L-shaped frame 30 as by bolts. The mandrel frame 54 has a longitudinal slot 56 formed in one of the side arms 57 and an elongate expander cam 58 is disposed for rotation in the longitudinal slot 56. A flexible mandrel cover 60 is slid over the mandrel frame 54 and expander cam 58. The mandrel cover 60 has a slit 67 which receives a tab 55 formed in the lower arm 59 of the mandrel frame 54 as shown in FIG. 7. FIG. 7 shows the mandrel 20 in the unexpanded position. When the mandrel cover 60 is expanded by rotating the expander cam 58 as described below, the slit 67 in the mandrel cover 60 leaves a gap around the mandrel frame tab 55.

Figure 9:
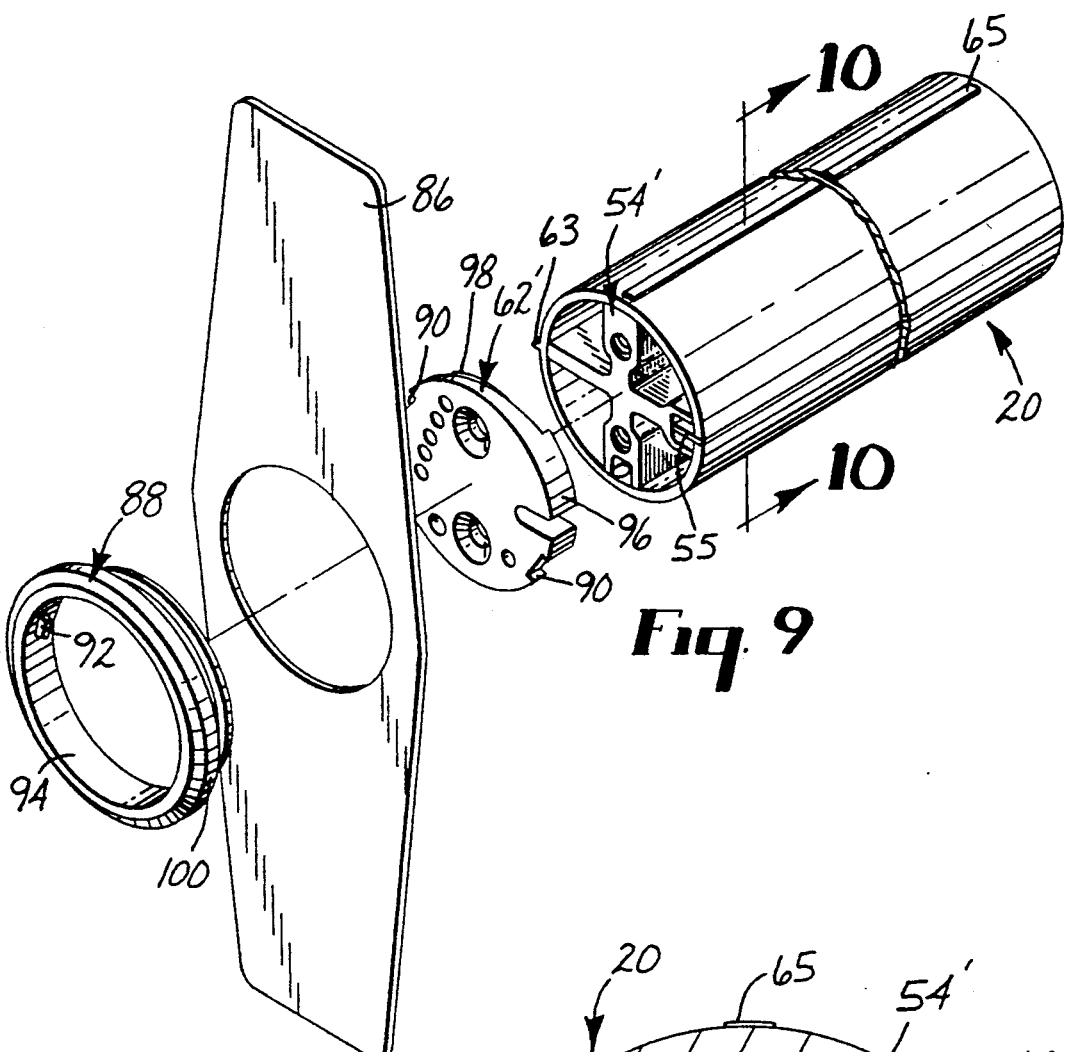
FIG. 9 is an exploded perspective view of the mandrel according to another embodiment of the present invention.
Figure 10:
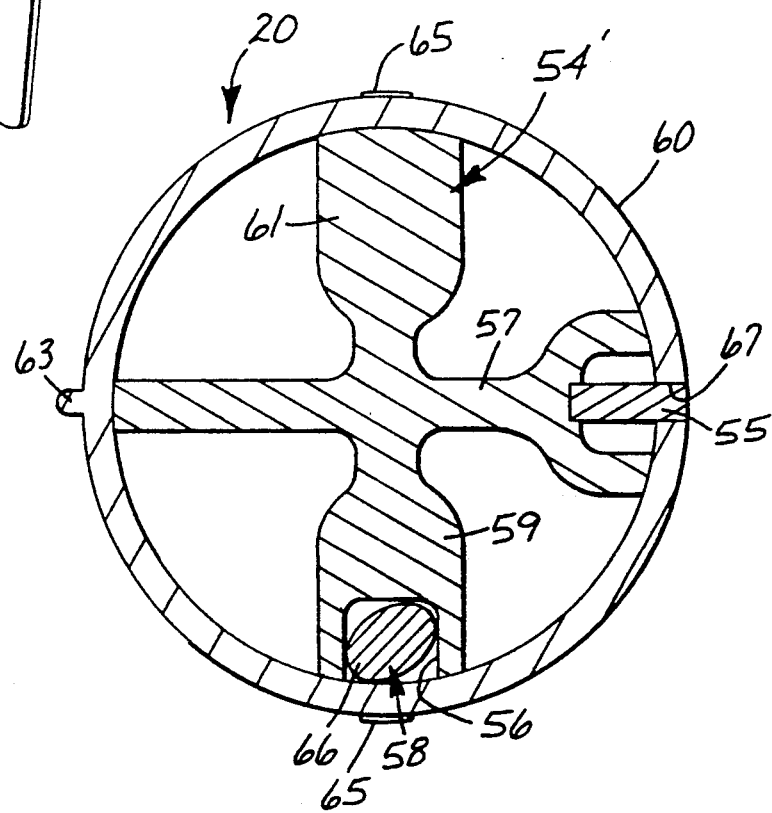
FIG. 10 is a cross-sectional view of the mandrel taken along line 10—10 of FIG. 9.

In the preferred embodiment of the mandrel frame shown in FIGS. 9 and 10, the mandrel frame 54' has the longitudinal slot 56 formed in the lower arm 59 and the tab 55 is formed in the side arm 57. Alternatively, the longitudinal slot 56 can be formed in the upper arm 61. It is preferred that the longitudinal slot 56 and the expander cam 58 be in the lower or upper arms 59, 61 to provide pressure against the mandrel cover 60 at these locations to optimize the contact between the mandrel frame 54' and the mandrel cover 60. This is because in practice, the mandrel frame 20 tends to contact the pancake cores 16 at only a few points based on the location of the expander cam 58, rather than continuously, and it is more efficient to locate these points vertically. Where a differently-shaped mandrel frame is used having equiangularly-spaced arms, such as a three-armed frame, it is preferred that at least one arm be oriented vertically, and that this arm have the longitudinal slot 56 to receive the expander cam 60.

Preferably, the mandrel cover 60 includes a longitudinal key 63 which is received in keyways (not shown) on the inner surface of the pancake core 16. This prevents the pancakes 12 from rotating. Optionally, deformable longitudinal strips 65 can be formed along the length of the mandrel cover 60 to engage the cores 16, take up slack, and serve as shock absorbers. Preferably, these strips would be located at locations where the mandrel 20 contacts the pancake cores 16.

An end cap 62 is fixed on the free end of the mandrel frame 54. The end cap 62 prevents the mandrel cover 60 from sliding off of the mandrel frame 54 and has a slot 64. The slot 64 receives and prevents the expander cam 58 from sliding out of the longitudinal slot 56 in the mandrel frame 54. The portion of the end cap defining the slot 64 is received in a circumferential groove 74 in the end of the expander cam 58. When the expander cam 58 is rotated, a cam lobe 66 presses against the mandrel cover 60 to expand the cover against the cores 16.

The mandrel frame 54 and expander cam 58 are made of extruded aluminum or other material having a suitable strength-to-weight ratio. The mandrel cover 60 can be made from any strong, lightweight material such as high density polyethylene or rigid polyvinyl chloride without high lubricity to enable frictional locking of the pancakes 12.

The mandrel 20 also includes a wrench 68 which fits over the end of the expander cam 58 to rotate the expander cam 58 to expand or contract the circumference of the mandrel 20. The wrench 68 also serves, in combination with a series of locking holes 70 in the end cap 62, to lock the expander cam 58 in position. The wrench 68 includes a locking tang 72 which is receivable in one of the locking holes 70 while the cam-engaging portion 76 of the wrench 68 remains on the expander cam 58 to lock the expander cam 58. A snap ring (not shown) is received in the groove 74 of the expander cam 58 to prevent the wrench 68 from being removed inadvertently from the expander cam 58. In alternative embodiments, the orientation of the cam-engaging portion 76 of the wrench 68 with respect to the body of the wrench 68 can be changed to reduce the amount of required rotation of the wrench 68 to lock the expander cam 58 in position.

Figure 11:
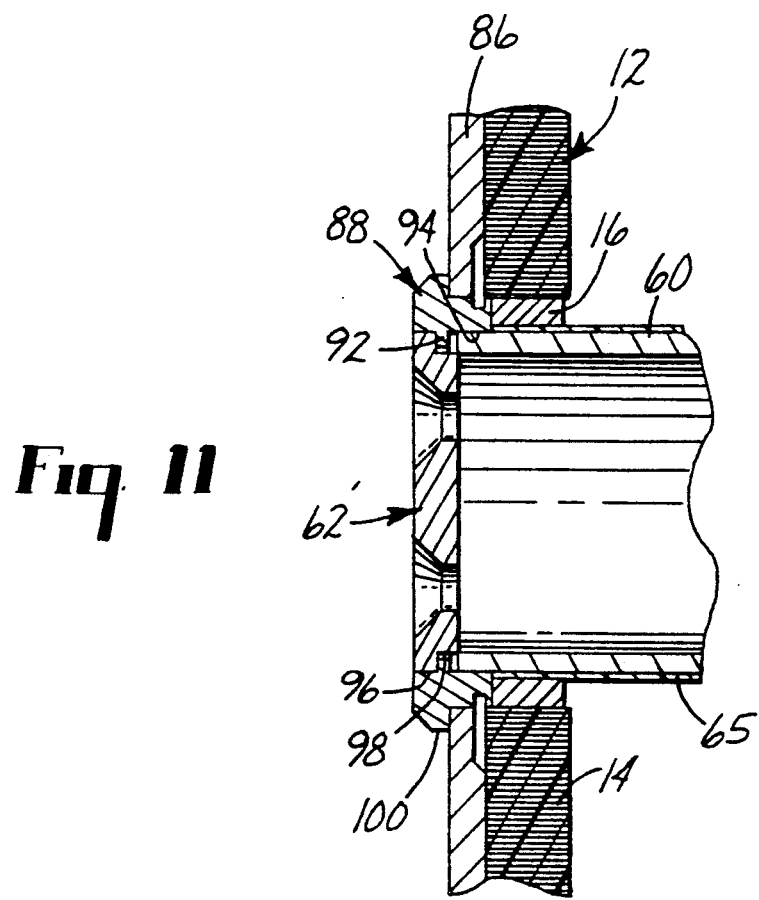
FIG. 11 is a cross-sectional view of the mandrel of FIG. 9.

An alternative embodiment of the mandrel 20 provides an axial compression load to hold together the pancakes 12 in addition to providing a radial load on the pancakes 12. As shown in FIGS. 9-11, a padded compression plate 86 is placed on the end cap 62' and compresses the pancakes 12 on the mandrel 20. A cylindrical compression ring 88 is placed on the end cap 62' over the compression plate 86. The end cap 62' has a pair of opposed detents 90 which receive tabs 92 formed on the inner surface 94 of the compression ring 88. The outer edge 96 of the end cap 62' has a ramped slot 98 which acts like a thread and receives the tabs 92 of the compression ring 88 and presses the compression plate 86 against the pancakes 12 as the compression ring 88 is rotated onto the end cap 62'. The compression plate 86 and the compression ring 88 can be integrally formed as one element with tabs 92 which are received in the detents 90 and ramped slot 98 as above. After the compression plate 86 and the compression ring 88 are secured onto the end cap 62', the wrench 68 is moved to the appropriate locking hole 70 to expand the mandrel 20. Preferably, when the wrench is in this locked position, the cam-engaging portion 76 extends beyond the outer edge 100 of the compression ring 88 to assist in maintaining the compression ring 88 in position.

Figure 8:
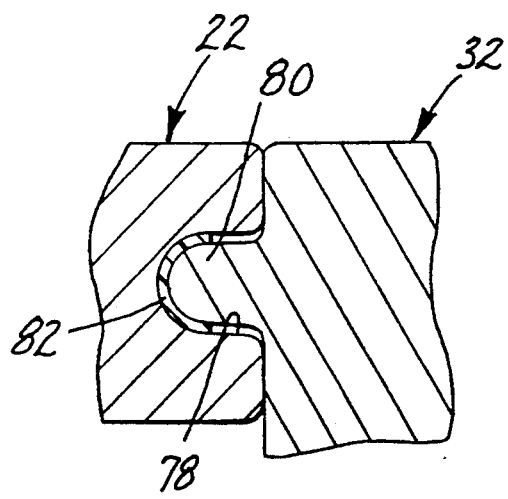
FIG. 8 is a cross-sectional view of the cover taken along line 8—8 of FIG. 1.

The container cover 22 is secured onto the enclosure 32 with fasteners so that the container 10 seals out dust and other contaminants. A groove 78 in the cover 22 receives a complementarily-shaped projection 80 on the enclosure 32 to prevent relative motion between the cover 22 and the enclosure 32. Alternatively, other locating devices such as dowels, bosses, or similar devices can be used. A gasket 82, shown in FIG. 8, can be adhered in the groove 78 to seal between the cover 22 and the enclosure 32. Over-the-center levers, elastomeric straps pulled over a peg, or other devices can be used to secure the cover 22 to the enclosure 32. A plurality of securing devices are distributed, preferably evenly, around the container 10. These devices can be recessed to prevent inadvertent opening and damage during handling of the container 10.

The container 10 can be carried on a cart 84 for transportation to various locations where pancakes 12 are used. The cart 84 can have a surface for the container at any convenient height. This arrangement greatly simplifies the handling of pancakes. For example, with known containers, a pancake must be moved first from a slitter to a cart, then from the cart to a package in which it is packed, then, after shipping, from the package to another cart after unpacking, and from that cart to a winding or duplicating machine. Packaging and unpacking are time-consuming operations which increase the potential for damage to the pancakes as describe above. However, with the container 10, the pancake is placed from the slitter directly into the container in which it is shipped, and then from the container it is placed directly on a winding or duplicating machine. Thus, the container 10 serves as both a shipping container as well as a rack to be used during the tape handling processes and is reusable.

Additionally, the containers 10 can be loaded, four at a time, onto a pallet for shipping. The containers 10 are dimensioned to fit within the area defined by the lip of a pallet. A second set of four containers 10 can be stacked on a nesting pallet disposed on a lower first set of containers 10. The containers 10 can be strapped together using commercially available strapping bands, tapes, or shrink wrap.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

We claim:

1. A container for pancakes of recording tape, wherein each pancake includes a quantity of tape wound around a core, wherein the container comprises:
   a base;
   at least one mandrel extending from the base on which a plurality of pancakes can be placed, wherein the circumference of each mandrel is expandable to engage and secure the pancakes in position thereon, and wherein each mandrel comprises a mandrel frame having a longitudinal slot, an elongate expander cam rotatably disposed in the mandrel frame longitudinal slot, and a flexible mandrel cover; and
   a cover which combines with the base to completely enclose the pancakes.

2. The container of claim 1 wherein each mandrel further comprises an end cap disposed on the free end of the mandrel and having a slot for receiving and preventing the expander cam from sliding out of the longitudinal slot.

3. The container of claim 2 wherein the mandrel further comprises means for rotating the expander cam to expand or contract the circumference of the mandrel, and means for locking the expander cam in position.

4. The container of claim 3 wherein the end cap has a series of locking holes and wherein the rotating and locking means comprises a wrench, wherein the wrench comprises a locking tang receivable in one of the locking holes in the end cap while the cam-engaging portion of the wrench remains on the cam to lock the cam in position.

5. The container of claim 4 wherein the end of the cam includes means for preventing the wrench from being removed inadvertently from the cam, wherein the preventing means comprises a snap ring disposed on the end of the cam.

6. The container of claim 1 further comprising means for providing a compression load to hold the pancakes together, wherein the compression load providing means comprises a compression plate placed on the mandrel.

7. The container of claim 6 wherein the compression plate is rotated onto the mandrel and pressed against the pancakes.

8. The container of claim 1 further comprising means for providing a compression load to hold the pancakes together, wherein the compression load providing means comprises a compression plate placed on the mandrel and a cylindrical compression ring placed on the mandrel over the compression plate, wherein the compression ring is rotated onto the mandrel and presses the compression plate against the pancakes.

9. The container of claim 1 wherein the cover comprise a longitudinal key which is received in keyways on the inner surface of the pancake core to prevent the pancakes from rotating.

10. The container of claim 1 wherein the longitudinal slot of the mandrel frame is formed in the lower portion of the mandrel frame.

11. The container of claim 1 wherein the mandrels are positioned substantially horizontally.

12. The container of claim 1 wherein the base is L-shaped having a vertical portion and a horizontal portion and the mandrels extend from the vertical portion of the L.

13. The container of claim 12 wherein the base comprises an L-shaped frame and an L-shaped enclosure and wherein the enclosure has a cavity which receives the frame.

14. The container of claim 13 wherein the bottom of the L-shaped enclosure includes channels extending across and above the horizontal portion of the L-shaped frame which can receive lifting devices while preventing the container from tipping.

15. The container of claim 1 wherein the cover includes recesses for receiving and supporting the free ends of the mandrels.

16. The container of claim 15 wherein the cover has an internal space shaped to approximate the shape and size of a plurality of pancakes.

17. A container for pancakes of recording tape, wherein each pancake includes a quantity of tape wound around a core, wherein the container comprises:
   an L-shaped base, wherein the base has a vertical portion and a horizontal portion;
   at least one mandrel extending from the base on which a plurality of pancakes can be placed, wherein the circumference of each mandrel is expandable to secure the pancakes in position thereon and wherein the mandrels are positioned substantially horizontally and extend from the vertical portion of the L; and
   a cover which combines with the base to completely enclose the pancakes.

18. The container of claim 17 wherein the base comprises an L-shaped frame and an L-shaped enclosure and wherein the enclosure has a cavity which receives the frame.

19. The container of claim 18 wherein the bottom of the L-shaped enclosure includes channels extending across and above the horizontal portion of the L-shaped frame which can receive lifting devices while preventing the container from tipping.

* * * * *